United States Patent [19]

Nagano et al.

[11] Patent Number: 4,690,015

[45] Date of Patent: Sep. 1, 1987

[54] POWER TRANSFER DEVICE FOR AUTOMOTIVE VEHICLES

[75] Inventors: Shuji Nagano; Shuichiro Ida; Toshio Yoshinaka; Shozo Okuda, all of Toyota, Japan

[73] Assignee: Toyota Jidosha Kabushiki Kaisha, Toyota, Japan

[21] Appl. No.: 805,748

[22] Filed: Dec. 6, 1985

[30] Foreign Application Priority Data

Dec. 7, 1984 [JP] Japan .................. 59-186353[U]

[51] Int. Cl.⁴ .................................. F16H 37/06
[52] U.S. Cl. .......................... 74/665 GE; 74/665 T; 74/740; 180/250
[58] Field of Search ............... 180/247, 248, 249, 250; 74/665 G, 665 GE, 665 T, 740, 785

[56] References Cited

U.S. PATENT DOCUMENTS

| | | | |
|---|---|---|---|
| 4,103,753 | 8/1978 | Holdeman | 180/247 |
| 4,292,860 | 10/1981 | Kako et al. | 74/665 GA |
| 4,298,085 | 11/1981 | Moroto et al. | 180/247 |
| 4,299,140 | 11/1981 | Kako et al. | 74/665 G |
| 4,404,869 | 9/1983 | Numazawa et al. | 74/740 |
| 4,422,349 | 12/1983 | Matsumoto et al. | 74/665 GE |
| 4,440,042 | 4/1984 | Holdeman | 74/785 |
| 4,458,557 | 7/1984 | Hayakawa | 74/665 GE |
| 4,503,927 | 3/1985 | Hayakawa et al. | 180/247 |
| 4,582,159 | 4/1986 | Suzuki | 180/247 |

FOREIGN PATENT DOCUMENTS 2747786 4/1978 Fed. Rep. of Germany ...... 180/250

Primary Examiner—Leslie Braun
Assistant Examiner—Dwight Diehl
Attorney, Agent, or Firm—Oblon, Fisher, Spivak, McClelland, & Maier

[57] ABSTRACT

A power transfer device includes an input shaft for connection to an output shaft of a power transmission, a first output shaft rotatably coupled at the inner end thereof with the input shaft, a second output shaft arranged in parallel with the input and first output shafts, an output member rotatably mounted on the first output shaft and being operatively connected to the second output shaft, a planetary gear unit mounted on the input shaft and having an input member connected with the input shaft and an output element for providing a low speed drive power train, a first sleeve member mounted on the first output shaft between the planetary gear unit and the output member and shiftable between a first position where the first sleeve member is retained to connect the first output shaft to the input shaft and a second position where the first sleeve member is retained to connect the first output shaft to the output element of the planetary gear unit, and a second sleeve member mounted on the first output shaft between the first sleeve member and the output member and shiftable between a first position where the second sleeve member is retained to connect the output member to the first output shaft and a second position where the second sleeve member is retained to disconnect the output member from the first output shaft.

4 Claims, 2 Drawing Figures

POWER TRANSFER DEVICE FOR AUTOMOTIVE VEHICLES

BACKGROUND OF THE INVENTION

1. Field of the Invention

The present invention relates to a power transfer device associated with a power transmission for a four wheel drive vehicle to selectively transfer output drive torque of the power transmission to a pair of front road wheels and a pair of rear road wheels, and more particularly to a power transfer device capable of selectively providing a high speed two wheel drive, a high speed four wheel drive, and a low speed four wheel drive.

2. Description of the Prior Art

In a Japanese Early Publication for Patent No. 58-211056, there has been proposed a power transfer device of this kind which comprises a change-speed mechanism capable of selectively establishing either a high speed drive power train or a low speed drive power train, and a changeover mechanism capable of selectively establishing either a two wheel drive power train or a four wheel drive power train. In such a conventional power transfer device as described above, two independent shift mechanisms are installed in a space in the transfer device to operate the change-speed mechanism and the changeover mechanism, respectively. For this reason, the transfer device may not be of a small size due to the existence of each space for the shift mechanisms.

SUMMARY OF THE INVENTION

It is, therefore, a primary object of the present invention to provide an improved power transfer device wherein both the change-speed mechanism and the changeover mechanism are arranged adjacent each other on a common axis to be operated under control of a single shift mechanism.

According to the present invention, the primary object is accomplished by providing a power transfer device associated with a power transmission for an automotive vehicle, which transfer device comprises an input shaft for connection to an output shaft of the power transmission, a first output shaft arranged coaxially with the input shaft and rotatably coupled at the inner end thereof with the input shaft, a second output shaft arranged in parallel with the input and first output shafts, an output member rotatably mounted on the first output shaft and being operatively connected to the second output shaft, a change-speed mechanism in the form of a planetary gear unit mounted on the input shaft and having an input member connected with the input shaft and an output element for providing a low speed drive power train, a first sleeve member mounted on the first output shaft between the planetary gear unit and the output member and shiftable between a first position where the first sleeve member is retained to connect the first output shaft to the input shaft and a second position where the first sleeve member is retained to connect the first output shaft to the output element of the planetary gear unit, and a second sleeve member mounted on the first output shaft between the first sleeve member and the output member and shiftable between a first position where the second sleeve member is retained to connect the output member to the first output shaft and a second position where the second sleeve member is retained to disconnect the output member from the first output shaft.

BRIEF DESCRIPTION OF THE DRAWING

Additional objects, features and advantages of the present invention will be apparently understood from the following detailed description of a preferred embodiment thereof when taken in connection with the accompanying drawing, in which.

DESCRIPTION OF THE PREFERRED EMBODIMENT

Figure 1:
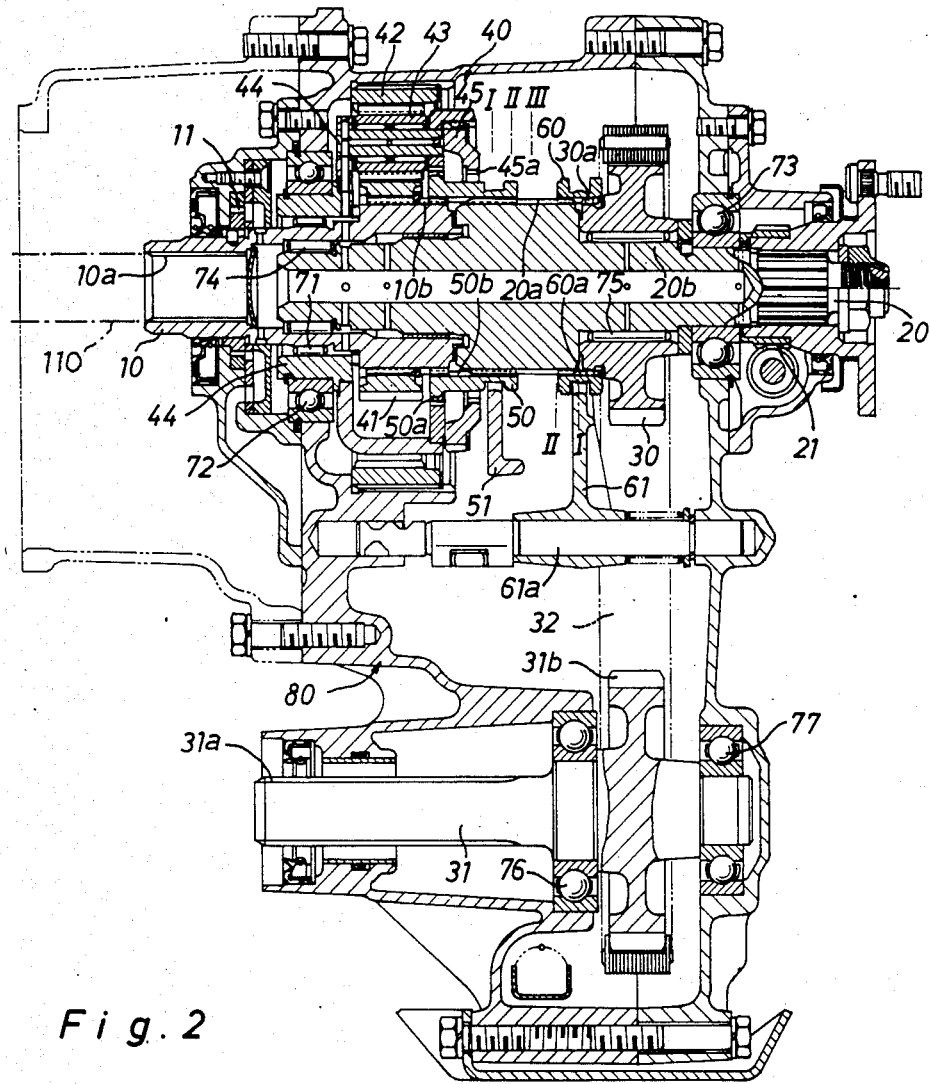
FIG. 1 is a full sectional view of a power transfer device in accordance with the present invention.

In FIG. 1 of the drawing, there is illustrated a power transfer device for a four wheel drive vehicle in accordance with the present invention, which transfer device includes, as main components, an input shaft 10, a first output shaft 20, a drive sprocket 30, a second output shaft 31, a planetary gear unit 40 and internally splined sleeve members 50 and 60. The input shaft 10 has an internally splined portion 10a for connection to an output shaft 110 of a power transmission for the vehicle and has an externally splined portion 10b for mounting the planetary gear unit 40 thereon. The input shaft 10 is rotatably supported on a left-hand side wall of a housing 80 through a needle bearing 71, a carrier 44 of the planetary gear unit 40 and a ball bearing 72. An oil pump 11 is mounted on the outer end portion of input shaft 10 to supply lubricating oil to bearing portions and intermeshed portions in the transfer device.

The first output shaft 20 is formed with a splined hub portion 20a and a journal portion 20b and is arranged coaxially with the input shaft 10 for connection to rear wheel drive axles (not shown). The first output shaft 20 is rotatably supported on a right-hand side wall of the housing 80 through a ball bearing 73 and has an inner end portion coupled within the inner end portion of input shaft 10 through a needle bearing 74 for relative rotation. A drive gear 21 for a speedometer is fixedly mounted on the outer end portion of the first output shaft 20. The drive sprocket 30 is rotatably supported on the journal portion 20b of first output shaft 20 through a needle bearing 75 and is drivingly connected to the second output shaft 31 by means of a drive chain 32. The second output shaft 31 is arranged in parallel with the input and output shafts 10 and 20 and is rotatably supported by a pair of axially spaced ball bearings 76 and 77 mounted within the housing 80. The second output shaft 31 has an externally splined portion 31a for connection to front wheel drive axles and is integrally provided thereon with a driven sprocket 31b which is driven by the drive sprocket 30 through the drive chain 32.

The planetary gear unit 40 is adapted as a change-speed mechanism for the transfer device, which comprises a sun gear 41 mounted in place on the externally splined portion 10b of input shaft 10 for rotation therewith, a stationary ring gear 42 arranged concentrically with the sun gear 41 and secured to an internal cylindrical wall of housing 80, and a plurality of planetary gears 43 rotatably supported by the carrier 44 and in mesh with the sun gear 41 and the ring gear 42. An annular side gear 45 is integrally fixed to the right end of carrier 44 for rotation therewith and is formed with an internal spline 45a which is arranged to be engaged with the sleeve member 50. When the sleeve member 50 is axially moved to engage the internal spline 45a of side gear 45, the planetary gear unit 40 acts to transfer drive torque from the input shaft 10 to the first output shaft 20 therethrough at a predetermined reduction speed ratio.

Figure 2:
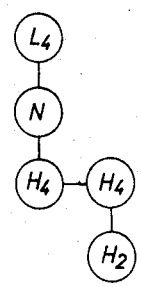
FIG. 2 illustrates a shift pattern of a manual shift lever adapted to the transfer device.

A first shift fork 51 is coupled with the sleeve member 50 to effect axial movement of the sleeve member 50. The shift fork 51 is arranged to be selectively connected to a single manual shift lever or single shift means (not shown) which is arranged in the vehicle compartment to be shifted by the operator. In FIG. 2 there is illustrated a shift pattern of the manual shift lever, wherein the characters $L_4$ and $H_4$ each indicate low and high speed positions for four wheel drive, and the character $H_2$ indicates a high speed position for two wheel drive. When the manual shift lever is retained in the left-hand high speed position $H_4$ in the shift pattern, the shift fork 51 is connected with the manual shift lever and positioned to retain the sleeve member 50 in a first position I. When the manual shift lever is shifted from the left-hand high speed position $H_4$ to a neutral position N in the shift pattern, the shift fork 51 is shifted to retain the sleeve member 50 in a second position II. When the manual shift lever is shifted from the neutral position N to the low speed position $L_4$ in the shift pattern, the shift fork 51 is shifted to retain the sleeve member 50 in a third position III.

The sleeve member 50 has an external spline 50a engageable with the internal spline 45a of side gear 45 and has an internal spline 50b axially slidably engaged with the externally splined portion 10b of input shaft 10 and the externally splined hub portion 20a of first output shaft 20. When retained in the first position I, the sleeve member 50 is disengaged from the internal spline 45a of side gear 45 and is in engagement with the externally splined portion 10b of input shaft 10 to effect direct connection between the input and output shafts 10 and 20. When shifted to and retained in the second position II, the sleeve member 50 is disengaged from the externally splined portion 10b of input shaft 10 and from the internal spline 45a of side gear 45 to allow free relative rotation between the input and output shafts 10 and 20. When shifted to and retained in the third position III, the sleeve member 50 is disengaged from the externally splined portion 10b of input shaft 10 and engaged with the internal spline 45a of side gear 45 to drivingly connect the input shaft 10 to the first output shaft 20 through the planetary gear unit 40.

A second shift fork 61 is coupled with the internally splined sleeve member 60 and carried at its base portion on a slide rod 61a which is axially slidably mounted within the housing 80. The second shift fork 61 is arranged to be selectively connected to the manual shift lever to be moved in such a manner as described below. When the manual shift lever is moved from the left-hand high speed position $H_4$ to the right-hand high speed position $H_4$ in the shift pattern, it is disconnected from the first shift fork 51 and connected with the second shift fork 61. When the manual shift lever is retained in the right-hand high speed postion $H_4$, the first shift fork 51 is positioned to retain the sleeve member 50 in the first position while the second shift fork 61 is positioned to retain the sleeve member 60 in a first position I as illustrated in FIG. 1. When the manual shift lever is shifted from the right-hand high speed position $H_4$ to the high speed position $H_2$ in the shift pattern, only the second shift fork 61 is shifted to retain the sleeve member 60 in a second position II.

The sleeve member 60 has an internal spline 60a axially slidably engaged with the externally splined hub portion 20a of first output shaft 20 and engageable with an external spline 30a formed on the left end of drive sprocket 30. When retained in the first position I, the sleeve member 60 is engaged with the external spline 30a of drive sprocket 30 to rotate the drive sprocket 30 with the first output shaft 20. When shifted to and retained in the second position II, the sleeve member 60 is disengaged from the external spline 30a of drive sprocket 30 to disconnect the drive sprocket 30 from the first output shaft 20.

Hereinafter, operation of the transfer device will be described with reference to FIGS. 1 and 2. Assuming that the manual shift lever is retained in the right-hand high speed position $H_4$, the first shift fork 51 is disconnected from the manual shift lever and positioned to retain the sleeve member 50 in the first position I, while the second shift fork 61 is connected with the manual shift lever and positioned to retain the sleeve member 60 in the first position. Thus, the input shaft 10 is directly connected to the first output shaft 20 to transfer the output drive torque from the power transmission to the rear wheel drive axles through the first output shaft 20, and the drive sprocket 30 is connected to the first output shaft 20 to drive the driven sprocket 31b through the drive chain 32 so as to transfer the output drive torque to the front wheel drive axles through the second output shaft 31. This provides a high speed four wheel drive. When the manual shift lever is shifted to the high speed position $H_2$ from the right-hand high speed position $H_4$, the shift fork 61 is moved to shift the sleeve member 60 to the second position II and retain it in the same position. Thus, the sleeve member 60 is disengaged from the external spline 30a of drive sprocket 30 to disconnect the first output shaft 20 from the second output shaft 31 thereby to provide a high speed two wheel drive.

Assuming that the manual shift lever is shifted from the left-hand high speed position $H_4$ to the neutral position N, only the first shift fork 51 is moved to shift the sleeve member 50 to the second position II and retain it in the same position, while the second shift fork 61 is disconnected from the manual shift lever and positioned to retain the sleeve member 60 in the first position I. Thus, the sleeve member 50 is disengaged from the externally splined portion 10b of input shaft 10 and the internal spline 45a of side gear 45 to disconnect the input shaft 10 from the first output shaft 20 thereby to disable the power transmission to the first and second output shafts 20 and 31. When the manual shift lever is shifted from the neutral position N to the low speed position $L_4$, the shift fork 51 is moved to shift the sleeve member 50 to the third position III and retain it in the same position. Thus, the sleeve member 50 is engaged with the internal spline 45a of side gear 45 to connect the input shaft 10 to the first output shaft 20 through the planetary gear unit 40 thereby to provide a low speed four wheel drive.

From the above description, it will be understood that the left-hand sleeve member 50 is arranged adjacent the right-hand sleeve member 60 on a common axis to minimize the axial length of the transfer device. It will be also understood that in operation of the transfer device, only the left-hand sleeve member 50 is moved to selectively provide the high speed four wheel drive or the low speed four wheel drive, and only the right-hand sleeve member 60 is moved to provide the high speed two wheel drive. This means that the third position III of the sleeve member 50 is commonly utilized with the second position II of the sleeve member 60 to minimize the axial space for movements of the sleeve members 50 and 60. In the actual practice of the present invention, the neutral position of the sleeve member 50 may be eliminated to minimize the axial space for movements of the sleeve members 50 and 60.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A power transfer device associated with a power transmission for an automotive vehicle, comprising:

an input shaft for connection to an output shaft of said power transmission;

a first output shaft arranged coaxially with said input shaft and rotatably coupled at the inner end thereof with said input shaft;

a second output shaft arranged in parallel with said input and first output shafts;

an output member rotatably mounted on said first output shaft and connectable with said first output shaft, said output member being operatively connected to said second output shaft;

a change-speed mechanism mounted on said input shaft and having an input element connected with said input shaft, a first output element for providing a high speed drive power train, and a second output element for providing a low speed drive power train;

first coupling means mounted on said first output shaft between said change-speed mechanism and said output member and shiftable between a first position where said first coupling means is retained to connect said first output shaft to the first output element of said change-speed mechanism and a second position where said first coupling means is retained to connect said first output shaft to the second output element of said change-speed mechanism;

second coupling means mounted on said first output shaft between said first coupling means and said output member and shiftable between a first position where said second coupling means is retained to connect said output member to said first output shaft and a second position where said second coupling means is retained to disconnect said output member from said first output shaft; and a shift means for shifting said first and second coupling means between their respective first and second positions wherein said first coupling means is arranged to be shifted to and from the second position only when said second coupling means is retained in the first position, while said second coupling means is arranged to be shifted to and from the second position only when said first coupling means is retained in the first position.

2. A power transfer device as claimed in claim 1, wherein said change-speed mechanism is in the form of a planetary gear unit including a sun gear mounted on said input shaft for rotation therewith, a stationary ring gear arranged concentrically with said sun gear, a carrier rotatably mounted on said input shaft, a plurality of planetary gears rotatably supported by said carrier and in mesh with said sun gear and said ring gear, and a side gear fixed to said carrier for rotation therewith, and wherein said first coupling means is arranged to connect said first output shaft to said input shaft in its first position and to connect said first output shaft to said side gear of said planetary gear unit in its second position.

3. A power transfer device as claimed in claim 1, wherein said output member is a drive sprocket rotatable on said first output shaft, and said second output shaft is integrally formed with a driven sprocket interconnected to said drive sprocket by means of a drive chain.

4. A power transfer device associated with a power transmission for an automotive vehicle, comprising:

an input shaft for connection to an output shaft of said power transmission;

a first output shaft arranged coaxially with said input shaft and rotatably coupled at the inner end thereof with said input shaft;

a drive sprocket rotatably mounted on said first output shaft and connectable with said first output shaft;

a second output shaft arranged in parallel with said input and first output shafts and being provided thereon with a driven sprocket interconnected to said drive sprocket by means of a drive chain;

a planetary gear unit mounted on said input shaft and having an input element connected with said input shaft and an output element for providing a low speed drive power train;

a first sleeve member axially slidably mounted on said first output shaft between said planetary gear unit and said drive sprocket and shiftable between a first position where said first sleeve member is retained to connect said first output shaft to said input shaft and a second position where said first sleeve member is retained to connect said first output shaft to said output element of said planetary gear unit;

a second sleeve member axially slidably mounted on said first output shaft between said first sleeve member and said drive sprocket and shiftable between a first position where said second sleeve member is retained to connect said drive sprocket to said first output shaft and a second position where said second sleeve member is retained to disconnect said drive sprocket from said first output shaft, and a shift means for shifting said first and second coupling means between their respective first and second positions wherein said first sleeve member is arranged to be shifted to and from the second position only when said second sleeve member is retained in the first position, while said second sleeve member is arranged to be shifted to and from the second position only when said first sleeve member is retained in the first position.

* * * * *